United States Patent
Yang et al.

(10) Patent No.: US 8,874,718 B2
(45) Date of Patent: Oct. 28, 2014

(54) METHOD AND DEVICE FOR STORING DOMAIN NAME SYSTEM RECORDS, METHOD AND DEVICE FOR PARSING DOMAIN NAME

(71) Applicant: Huawei Technologies Co., Ltd., Shenzhen (CN)

(72) Inventors: Jian Yang, Shenzhen (CN); Guoqiao Chen, Shenzhen (CN); Lei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 13/673,563

(22) Filed: Nov. 9, 2012

(65) Prior Publication Data

US 2013/0066842 A1   Mar. 14, 2013

Related U.S. Application Data

(60) Division of application No. 12/572,840, filed on Oct. 2, 2009, which is a continuation-in-part of application No. PCT/CN2008/070604, filed on Mar. 27, 2008.

(30) Foreign Application Priority Data

Apr. 4, 2007   (CN) .......................... 2007 1 0100503

(51) Int. Cl.
*G06F 15/167*   (2006.01)
*H04L 29/12*   (2006.01)
*H04L 29/06*   (2006.01)

(52) U.S. Cl.
CPC .... *H04L 29/12066* (2013.01); *H04L 29/12132* (2013.01); *H04L 61/1511* (2013.01); *H04L 61/1552* (2013.01); *H04L 69/28* (2013.01)
USPC .......................................................... 709/223

(58) Field of Classification Search
USPC ..................... 709/223, 226, 245; 707/10, 201
See application file for complete search history.

(56) References Cited

U.S. PATENT DOCUMENTS

| 6,016,512 | A | * | 1/2000 | Huitema ........................ 709/245 |
| 6,247,076 | B1 | | 6/2001 | Ono |
| 6,701,329 | B1 | * | 3/2004 | Esibov et al. .......................... 1/1 |

(Continued)

FOREIGN PATENT DOCUMENTS

| CN | 1243368 A | 2/2000 |
| CN | 1319814 A | 10/2001 |

(Continued)

OTHER PUBLICATIONS

Rejection Decision of Chinese Application No. 201010138870.7 mailed May 10, 2013, 19 pages. (Paritial Translation).

(Continued)

*Primary Examiner* — Sargon Nano
(74) *Attorney, Agent, or Firm* — Slater & Matsil, L.L.P.

(57) ABSTRACT

A method for storing domain name system (DNS) records includes locally storing received DNS records needed to be stored. If the size of all the stored DNS records does not satisfy a preset storing threshold, a part of the stored DNS records are deleted to make the size of the remaining DNS records after deletion satisfy the storing threshold. A domain name parsing method, device, and server are also provided.

20 Claims, 6 Drawing Sheets

(56) References Cited

U.S. PATENT DOCUMENTS

| | | | |
|---|---|---|---|
| 6,766,380 B1 | 7/2004 | Hong et al. | |
| 7,116,654 B2* | 10/2006 | Kim | 370/338 |
| 7,290,060 B2 | 10/2007 | Kong | |
| 7,444,371 B2* | 10/2008 | Douglis et al. | 709/203 |
| 7,467,126 B2* | 12/2008 | Smith et al. | 1/1 |
| 7,520,339 B2 | 4/2009 | Ikenoya | |
| 7,529,810 B2 | 5/2009 | Goto et al. | |
| 7,680,956 B2* | 3/2010 | Volz et al. | 709/245 |
| 7,836,142 B2 | 11/2010 | Filippi | |
| 7,853,720 B2 | 12/2010 | Choi et al. | |
| 7,865,618 B2* | 1/2011 | Howell et al. | 709/245 |
| 7,958,261 B2* | 6/2011 | Howell et al. | 709/242 |
| 7,970,878 B1* | 6/2011 | Burshan et al. | 709/223 |
| 8,073,971 B2* | 12/2011 | Roberts et al. | 709/245 |
| 8,266,288 B2* | 9/2012 | Banerjee et al. | 709/226 |
| 8,489,637 B2* | 7/2013 | Patil | 707/783 |
| 8,499,064 B2 | 7/2013 | Akiyama et al. | |
| 8,510,448 B2 | 8/2013 | Richardson et al. | |
| 2003/0200335 A1 | 10/2003 | Choi et al. | |
| 2004/0199510 A1 | 10/2004 | Bustillo Velasco et al. | |
| 2004/0215823 A1* | 10/2004 | Kleinfelter et al. | 709/245 |
| 2005/0015471 A1 | 1/2005 | Zhang et al. | |
| 2005/0015507 A1 | 1/2005 | Chin | |
| 2005/0188225 A1 | 8/2005 | Ikenoya | |
| 2005/0286510 A1 | 12/2005 | Nakajima et al. | |
| 2006/0075139 A1* | 4/2006 | Jungck | 709/245 |
| 2006/0129665 A1 | 6/2006 | Toebes et al. | |
| 2006/0152636 A1 | 7/2006 | Matsukawa et al. | |
| 2007/0165542 A1 | 7/2007 | Shin et al. | |
| 2008/0114897 A1* | 5/2008 | Awadallah et al. | 709/245 |
| 2008/0168103 A1* | 7/2008 | Rakic | 707/200 |
| 2008/0244744 A1 | 10/2008 | Thomas et al. | |
| 2008/0300775 A1* | 12/2008 | Habaguchi | 701/116 |
| 2009/0070453 A1* | 3/2009 | Douglis et al. | 709/223 |
| 2009/0296128 A1 | 12/2009 | Hasegawa | |
| 2009/0313384 A1 | 12/2009 | Baratakke et al. | |
| 2010/0014536 A1 | 1/2010 | Lin et al. | |
| 2010/0106833 A1* | 4/2010 | Banerjee et al. | 709/226 |
| 2012/0124239 A1* | 5/2012 | Shribman et al. | 709/245 |
| 2012/0303735 A1* | 11/2012 | Raciborski et al. | 709/212 |
| 2013/0297826 A1* | 11/2013 | Raciborski et al. | 709/245 |

FOREIGN PATENT DOCUMENTS

| | | | |
|---|---|---|---|
| CN | 1713616 A | 12/2005 | |
| CN | 1744758 A | 3/2006 | |
| CN | 1751508 A | 3/2006 | |
| CN | 1805450 A | 7/2006 | |
| CN | 1815451 A | 8/2006 | |
| CN | 1842024 A | 10/2006 | |
| CN | 101087253 A | 12/2007 | |
| EP | 1713281 A2 | 10/2006 | |
| WO | 2006097903 A2 | 9/2006 | |
| WO | WO 2006/097903 A2 | 9/2006 | |
| WO | 2007100426 A1 | 9/2007 | |
| WO | WO 2007/100426 A1 | 9/2007 | |

OTHER PUBLICATIONS

Cui, C. et al., "The Implementation and Application of Dynamic Domain Names for campus network", Journal of Tianshui Normal University, Oct. 2005, vol. 25, No. 5, Network Center, Northwest A&F University, Yangling shaanxi 712100, China, 3 pages.

Wireless Profiled DNS Approved Version 1.0—Jun. 6, 2006, Open Mobile Alliance OMA-WAP-DNS-V1_0-20060606-A, Continues the Technical Activities, Orginated in the WAP Forum, 15 pages.

Written Opinion of the International Searching Authority and Translation received in Patent Cooperation Treaty Application No. PCT/CN2008/070604, mailed Jun. 3, 2008, 6 pages.

Second Chinese Office Action and Partial Translation of Main Text received in Chinese Application No. 200710100503.6, mailed Nov. 21, 2008, 7 pages.

First Chinese Office Action and Partial Translation received in Chinese Application No. 200710163101.0, mailed Dec. 18, 2009, 10 pages.

Second Chinese Office Action and Translation received in Chinese Application No. 201010138870.7, mailed Jul. 12, 2012, 16 pages.

First Chinese Office Action and Partial Translation received in Chinese Application No. 201010138870.7, mailed Jan. 31, 2012, 14 pages.

http://www.cs.wmich.edu/~alfuqaha/Fall09/cs5550/lectures/dns.pdf.

US Office Action received on U.S. Appl. No. 12/572,840, mailed on Sep. 16, 2013, 9 pages.

Cui, C. et al., "The Implementation and Application of Dynamic Domain Names for campus network," Journal of Tianshui Normal University, Oct. 2005, vol. 25, No. 5, Network Center, Northwest A&F University, Yangling shaanxi 712100, China, 3 pages.

Wireless Profiled DNS Approved Version 1.0—Jun. 6, 2006, Open Mobile Alliance OMA-WAP-DNS-V1_0-20060606-A, Continues the Technical Activities, Originated in the WAP Forum, 15 pages.

United States Office Action received in U.S. Appl. No. 12/572,840 mailed Apr. 8, 2014, 14 pages.

* cited by examiner

METHOD AND DEVICE FOR STORING DOMAIN NAME SYSTEM RECORDS, METHOD AND DEVICE FOR PARSING DOMAIN NAME

CROSS-REFERENCE TO RELATED APPLICATIONS

This application is a divisional application of U.S. patent application Ser. No. 12/572,840, filed on Oct. 2, 2009, which is a continuation-in-part of International Patent Application No. PCT/CN2008/070604, filed on Mar. 27, 2008. The International Application claims priority to Chinese Patent Application No. 200710100503.6, filed on Apr. 4, 2007. The aforementioned patent applications are hereby incorporated by reference in their entireties.

TECHNICAL FIELD

The present invention relates to a domain name system (DNS) technique, more particularly to a technique for storing DNS records and a technique for parsing domain name.

BACKGROUND

In the current Internet Protocol (IP) network, one domain name is corresponding to at least one IP address, and the corresponding relation between the domain name and the IP addresses can be stored in a domain name system (DNS) server. When a terminal intends to get access to a network equipment corresponding to a certain domain name, the terminal queries the DNS server about IP addresses corresponding to the domain name, thereby communicating or implementing other operations with the corresponding network equipment according to the IP addresses. In practical applications, the terminal may access the network equipment corresponding to the same domain name many times, so the terminal needs to frequently query the DNS server about the corresponding relation between the domain name and the IP addresses.

Additionally, when a terminal intends to get access to a network equipment corresponding to a certain domain name, the terminal usually sends a query request which carries the domain name to the DNS server, and the DNS server returns an IP address corresponding to the domain name as a response message to the terminal. In practical applications, one domain name may be corresponding to multiple IP addresses. The network equipment corresponding to each IP address may provide the same service, and definitely may provide different services respectively. Therefore, it is possible that the IP address returned by the DNS server to the terminal is inappropriate, which probably results in that the terminal sends a query request to the DNS server once again to acquire the appropriate IP address, thus increasing unnecessary network traffics.

SUMMARY OF THE INVENTION

Accordingly, the present invention is directed to a method and device for storing domain name system (DNS) records, which are capable of reducing the burden of a terminal with a small storage capacity when frequently querying the DNS about a domain name.

The present invention is also directed to a domain name parsing method and device, which are capable of completing a domain name parsing process in consideration of a DNS query request sender.

In an embodiment of the present invention, a method for storing DNS records is provided. The method includes locally storing received DNS records needed to be stored and if the size of all the stored DNS records does not satisfy a preset storing threshold, deleting a part of the stored DNS records to enable the size of the remaining DNS records after deletion to satisfy the storing threshold.

In an embodiment of the present invention, a device for storing DNS records is provided. The device includes a storage unit that is adapted to store received DNS records needed to be stored. A DNS record size detection unit is adapted to detect whether the size of all the DNS records stored in the storage unit satisfies a preset storing threshold. A DNS record cleanup unit is adapted to delete a part of the DNS records stored in the storage unit if the size of all the stored DNS records does not satisfy the storing threshold, so as to enable the size of the remaining DNS records after deletion to satisfy the storing threshold.

In an embodiment of the present invention, a terminal is provided. The terminal includes a storage unit that is adapted to store received DNS records needed to be stored. A DNS record size detection unit is adapted to detect whether the size of all the DNS records stored in the storage unit satisfies a preset storing threshold. A DNS record cleanup unit is adapted to delete a part of the DNS records stored in the storage unit if the size of all the stored DNS records does not satisfy the storing threshold, so as to enable the size of the remaining DNS records after deletion to satisfy the storing threshold.

In an embodiment of the present invention, a method for parsing a domain name is provided. The method includes receiving a DNS query request, The DNS query request carries a domain name needed to be parsed and at least one of a service identity (ID) for identifying a service type and user information for identifying a user ID. A network address corresponding to the domain name is selected according to at least one of the service ID and the user information. If the corresponding network address is selected, the selected network address is returned as a query result of the DNS query request.

In an embodiment of the present invention, a device for parsing a domain name is provided. The device includes a DNS query request receiving unit, adapted to receive a DNS query request. The DNS query request carries a domain name needed to be parsed and at least one of a service ID for identifying a service type and user information for identifying a user ID. A network address selecting unit is adapted to select a network address corresponding to the domain name according to at least one of the DNS service ID and the user information. A network address providing unit is adapted to return the selected network address as a query result of the DNS query request when the corresponding network address is selected.

In an embodiment of the present invention, a DNS server is provided. The DNS server includes a DNS query request receiving unit that is adapted to receive a DNS query request. The DNS query request carries a domain name needed to be parsed and at least one of a service ID for identifying a service type and user information for identifying a user ID. A network address selecting unit is adapted to select a network address corresponding to the domain name according to at least one of the DNS service ID and the user information. A network address providing unit is adapted to return the selected network address as a query result of the DNS query request when the corresponding network address is selected.

In an embodiment of the present invention, a method for acquiring a domain name parsing result is provided. The method includes sending a DNS query request to a DNS server. The DNS query request carries a domain name needed to be parsed and at least one of a service ID for identifying a service type and user information for identifying a user ID. At least one network address corresponding to the domain name provided by the DNS server is received. The network address is selected by the DNS server according to at least one of the service ID and the user information.

In an embodiment of the present invention, a device for acquiring a domain name parsing result is provided. The device includes a DNS query request sending unit that is adapted to send a DNS query request to a DNS server. The DNS query request carries a domain name needed to be parsed and at least one of a service ID for identifying a service type and user information for identifying a user ID. An IP address receiving unit is adapted to receive at least one network address corresponding to the domain name provided by the DNS server. The network address is selected by the DNS server according to at least one of the service ID and the user information.

In an embodiment of the present invention, a terminal is provided. The terminal includes: a DNS query request sending unit that is adapted to send a DNS query request to a DNS server. The DNS query request carries a domain name needed to be parsed and at least one of a service ID for identifying a service type and user information for identifying a user ID. An IP address receiving unit is adapted to receive at least one network address corresponding to the domain name provided by the DNS server. The network address is selected by the DNS server according to at least one of the service ID and the user information.

DETAILED DESCRIPTION OF ILLUSTRATIVE EMBODIMENTS

Figure 1:
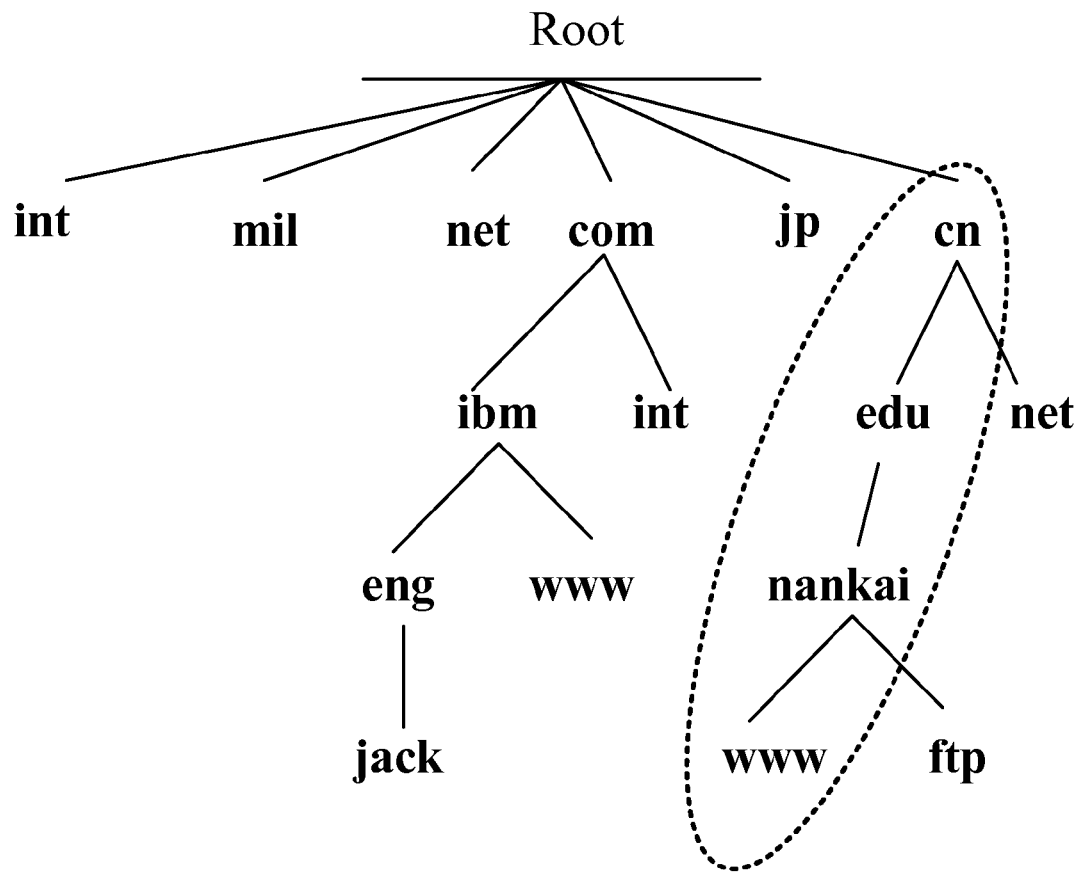
FIG. 1 is a schematic view of the structure of an Internet domain name according to an embodiment of the present invention.

All the embodiments of the present invention relate to the DNS technique. The related content of the DNS is first introduced before a detailed description of the embodiments of the present invention.

Hosts on the Internet can be identified by many means, for example, through their hostnames. As the hostname is mnemonic, for example, cnn.com and www.yahoo.com, people are more willing to use a hostname to identify a host. However, the hostname does not provide much information about the location of the host in the Internet. For example, if the hostname of a certain host is sina.com.cn, it is determined that the host is located in China, but no further location information is provided. Additionally, the hostname is composed of letters, numbers, and symbols with variable length, so it is difficult for the router to process.

In view of the above deficiency in identifying a hostname, hosts on the Internet may also be identified by IP addresses. Transmission Control Protocol (TCP)/Internet Protocol (IP) communication among the hosts on the Internet is accomplished through the IP addresses, and each host on the Internet has one IP address as its unique identification. The IP address is hierarchical. If an address is scanned from left to right, the location information about the corresponding host on the Internet can be obtained more explicitly.

However, the IP address is a numerical name that is hard to remember or understand. As a result, a problem arises, i.e., one host can be identified by a hostname or by an IP address. In practical applications, people are more willing to use the hostname to identify the host since the hostname is easy to remember; while routers and other network equipments prefer fixed-length and hierarchically structured IP addresses. For the convenience of application, the TCP/IP provides a symbol naming mechanism for the host, i.e., the domain name system (DNS). The DNS is a distributed database implemented in a hierarchy of name servers, and also an application-layer protocol that allows client hosts and name servers to communicate in order to provide the domain name translation service. The name server is usually a UNIX host that runs the Berkeley Internet Name Domain (BIND, a software name) software. The DNS protocol runs over the User Datagram Protocol (UDP), and its port number is 53. The DNS is capable of mapping dull and meaningless numbers into words or abbreviations of words with specific meanings that are easy to remember and understand. Particularly, during the construction of a website, the DNS is a primary issue that needs to be settled, which is also the basis for realizing www, File Transfer Protocol (FTP), E-mail, and other Internet applications.

Other application-layer protocols, such as Hypertext Transfer Protocol (HTTP), Simple Mail Transfer Protocol (SMTP), and FTP, generally adopt the DNS to translate a hostname provided by the user into an IP address. For example, when a user employs a browser (i.e., an HTTP client) running on the local host to request http://www.yesky.com, in order to send an HTTP request message to the web server named www.yesky.com, the browser must obtain the IP address of the web server. The browser extracts the hostname from the Uniform Resource Locator (URL), and transfers the extracted hostname to the DNS application client on the local host. The DNS application client sends a DNS query request message containing the extracted hostname to a DNS server, and then receives a reply message containing the IP address corresponding to the extracted hostname. After that, the browser opens a TCP connection to the HTTP server located at the extracted IP address. In addition to the translation service from the hostname to the IP address, the DNS also provides other important services as follows.

1. Hody aliasing: a host with a complicated hostname may have one or more alias names. For example, a hostname relay1.west-coast.enterprise.com may have other two aliases, respectively, enterprise.com and www.enterprise.com. Herein, the hostname relay1.west-coast.enterprise.com is called a canonical hostname, and the other two are called alias hostnames. Compared with the canonical hostname, the alias hostname is easier to remember. The DNS application client can invoke the DNS to obtain the canonical hostname and the IP address corresponding to a given alias hostname.

2. Mail server aliasing: an e-mail address generally needs to be easy to remember. For example, Bob (a user) has a hotmail account, and his e-mail address may simply be Bob@hotmail.com. However, the hostname of the hotmail server is more complicated than hotmail.com and is hard to remember. The e-mail application can invoke the DNS to obtain the canonical hostname and the IP address corresponding to a given alias hostname. In practical applications, the DNS allows the web server and mail server of one company to use the same alias hostname. For example, the web server and the mail server of a company may be both named as enterprise.com.

3. Load distribution: the DNS is increasingly adapted to perform load distribution among multiple replicated servers, such as replicated web servers. For example, busy sites, like cnn.com, are usually replicated over multiple web servers, and each web server runs on a different end system and has a different IP address. As for the replicated web servers, a single canonical hostname is associated with a set of IP addresses, and the set of IP addresses are stored in the DNS server. When a terminal sends a DNS query request for a hostname mapped to a set of IP addresses, the DNS server responds with the entire set of IP addresses, but rotates the ordering of the addresses within each reply. When getting access to a website, the browser generally sends an HTTP request message to the IP address arranged the first in the set that is queried by the DNS client. The DNS rotates to distribute the traffic of the website among all the replicated web servers. The e-mail application may also adopt the DNS rotation, so that multiple mail servers can have the same alias name.

The naming structure of the DNS is called a domain name space. The domain name space is a tree-like and hierarchically structured distributed database. A domain is a sub-tree or a branch of the domain name space, and the root node of the tree is a root domain, which is not named and denoted by ".". The node that is closest to the root domain in the tree is called a top-level domain. Each top-level domain is subdivided into multiple levels of domains and multiple sub-domains, and the hosts are located at the leaf nodes of the tree. A complete domain name is composed of node identifiers in the path from a node to the root node of the tree in an ordered sequence, where the node identifiers are separated by ".".

FIG. 1 shows a domain constituted by a sub-tree with ibm as its root and having a domain name of ibm.com. The www server, assigned with a domain hostname, is a host under the domain nankai.edu.en, and has a complete domain name of www.nankai.edu.cn. A set of formal universal standard labels has been specified in the Internet, and internationalized top-level domain names are formed, for example, corn for commercial organizations, and edu for educational institutions. Each country applying for joining the Internet is regarded as a top-level domain, and registers for a top-level domain name at the Internet Corporation for Assigned Names and Numbers (ICANN). The domain name of a country is identified by the country code, e.g., cn for China, and jp for Japan.

Only some basic contents about the DNS technique are described above, and the embodiments of the present invention will be described in detail below.

In practical applications, if a terminal intends to get access to a network equipment, the terminal usually sends a DNS query request to the DNS server, requesting the DNS server to parse a domain name (also referred to as a hostname) carried by the DNS query request. After parsing the domain name, the DNS server returns a parsing result to the terminal. The parsing result may be an IP address corresponding to the domain name or other related information, and the parsing result is called DNS records herein. After receiving the DNS records, the terminal stores the DNS records, so that when getting access to the same network equipment subsequently, the terminal does not need to query the DNS server about the IP address corresponding to the domain name again, but directly accesses the network equipment according to the IP address in the stored DNS records.

Hereinafter, a technical solution of a method for storing DNS records according to an embodiment is illustrated. The method includes locally storing newly received DNS records at a terminal; and if the size of all the stored DNS records is greater than or equal to a preset storing threshold, deleting a part of the stored DNS records, so that the size of the remaining DNS records is not greater than or is smaller than the storing threshold. It should be noted that, the size of all the stored DNS records may be determined in two manners and two types of corresponding results are obtained. That is, if the size of all the stored DNS records is greater than the preset storing threshold, a part of the DNS records is deleted, so that the size of the remaining DNS records is not greater than the storing threshold; and if the size of all the stored DNS records is equal to the preset storing threshold, a part of the DNS records is deleted, so that the size of the remaining DNS records is smaller than the storing threshold.

In the above embodiment of the method, a part of the stored DNS records is deleted in the following manner: if expired DNS records exist, deleting the expired DNS records; and if the size of the remaining DNS records is still greater than or equal to the storing threshold, deleting a part of the DNS records once again, so that the size of the remaining DNS records is not greater than or is smaller than the storing threshold.

In the above embodiment of the method, a part of the DNS records may be deleted once again in at least one of the following manners: deleting a part of the DNS records closest to expiration; selecting and deleting a part of the DNS records from all the DNS records about multiple IP addresses corresponding to one domain name; deleting the DNS records in sequence of storage; and deleting a part of the DNS records of low use rate.

The use rate of the DNS records may be determined in various manners. For example, each time the DNS records are used, the DNS records are tagged once. When making statistics on or querying the use rate of the DNS records, it is required to make statistic on the number of the tags of the DNS records only.

In the above embodiment of the method, if expired DNS records do not exist, a part of the DNS records is deleted, so that the size of the remaining DNS records is not greater than or is smaller than the storing threshold.

In the above embodiment of the method, before locally storing the newly received DNS records at the terminal, a time-to-live (TTL) in the new DNS records is determined, and if the TTL is 0, the new DNS records are not locally stored at the terminal; otherwise, the new DNS records are locally stored at the terminal.

In the above embodiment of the method, before receiving the new DNS records, the method further includes: sending a DNS query request to the DNS server; and returning, by the DNS server, at least one new DNS record according to the DNS query request. The DNS query request may carry at least one of a service ID and user information. In addition, the DNS server selects and returns at least one IP address according to at least one of the service ID and the user information.

Figure 2A:
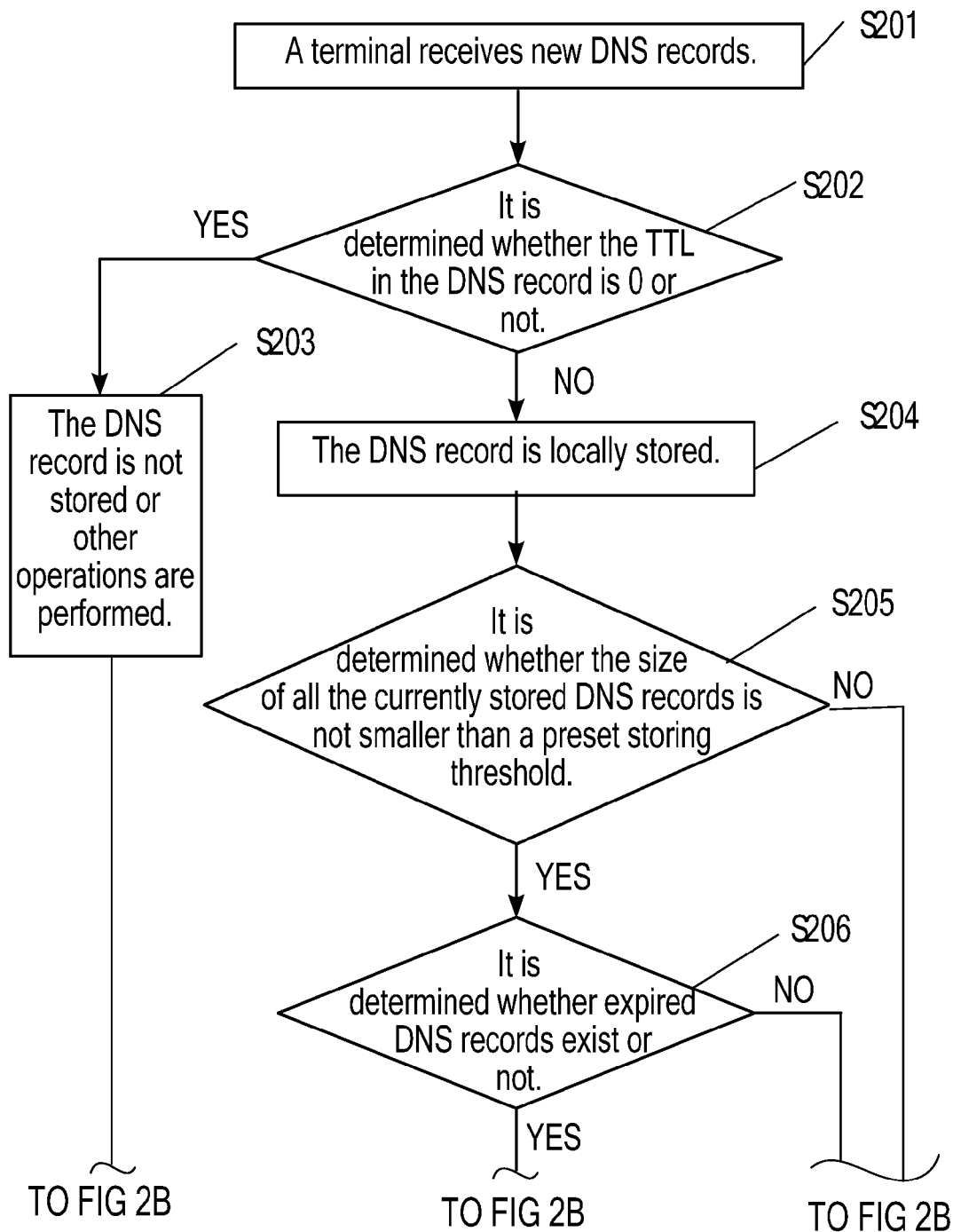
FIGS. 2A-2B are a flow chart of a method for storing DNS records according to an embodiment of the present invention.
Figure 2B:
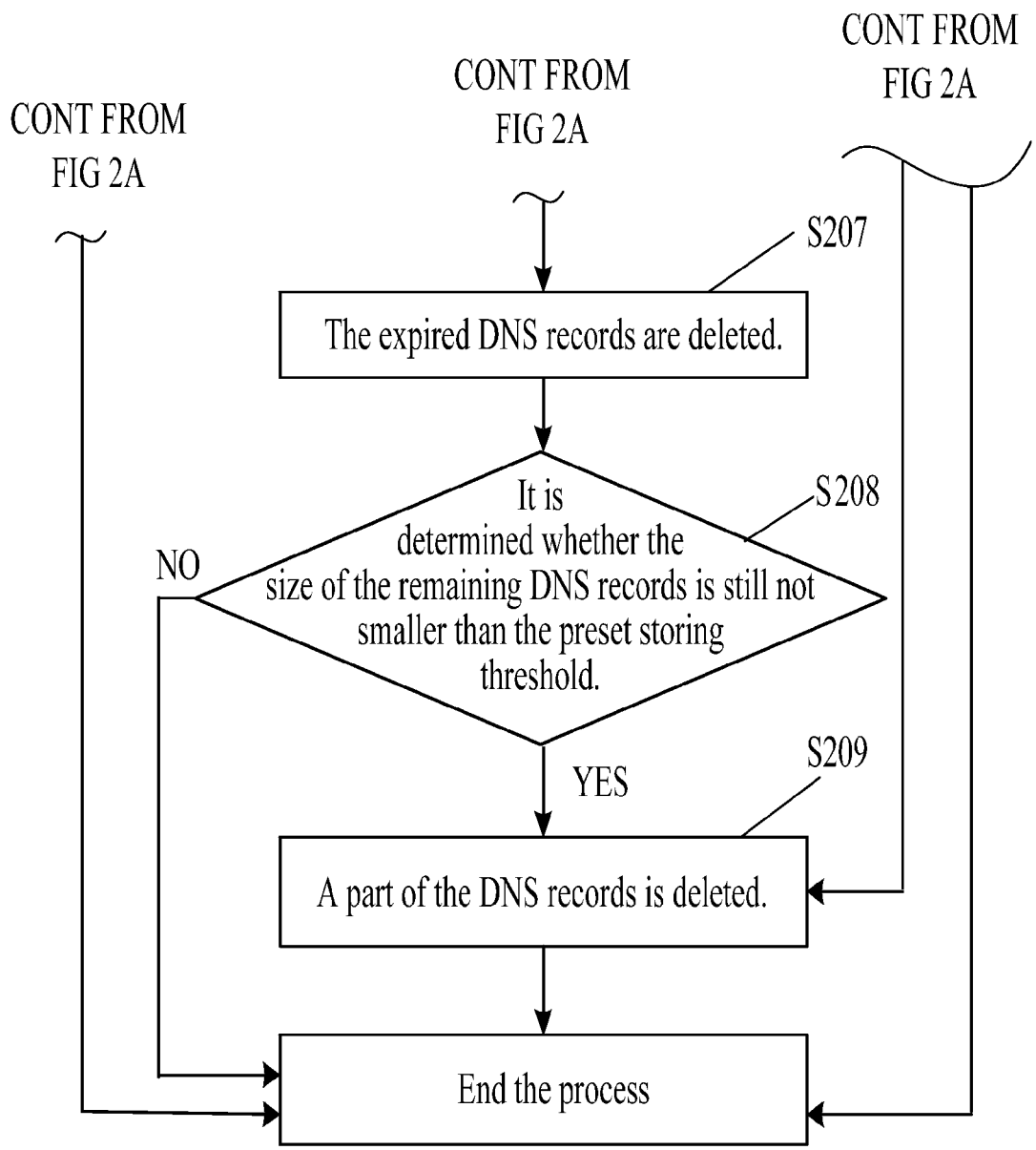

With reference to FIGS. 2A-2B, an embodiment of a method for storing DNS records is described in detail. Referring to FIGS. 2A-2B, the method includes the following steps.

In Step S201, a terminal receives new DNS records.

Herein, the terminal may take various forms, for example, a personal computer (PC) or mobile phone. As for terminals with a small storage capacity, such as mobile phones, the application of the embodiment of the method may achieve better effects.

The DNS records are provided by a DNS server to the terminal in the form of a response message. The response message carries at least one resource record (RR). Each RR is a four-tuple that contains the following fields: Name, Value, Type, and TTL. TTL stands for the time for storing the RR or the time-to-live of the IP address corresponding to the domain name. This time may be determined by the DNS server, and definitely may be determined by other network entities and the DNS server just forwards this time to the terminal.

The meaning of Name and Value depends on Type.

If Type=A, Name is a hostname and Value is an IP address corresponding to the hostname. Thereby, a Type A record provides the mapping of a standard hostname to an IP address. For example, (relay1.bar.foo.com, 145.37.93.126, A) is a Type A record.

If Type=NS, Name is a domain, such as foo.com, and Value is the hostname of an authoritative name server that can acquire the IP address of the host in the domain. This record is adapted to route the DNS query along the chain-link structure of the query. For example, (foo.com, dns.foo.com, NS) is a Type NS record.

If Type=CNAME, Value is a canonical hostname corresponding to the host alias NAME. This record provides a canonical hostname corresponding to the hostname to the host that sends the query. For example, (foo.com, relay1.bar.foo.com, CNAME) is a Type CNAME record.

If Type=MX, Value is a hostname of a mail server having the host alias NAME. For example, (foo.com, mail.bar.foo.com, MX) is a Type MX record. The Type MX record enables the hostname of the mail server to have simple alias.

For example, three DNS records are listed as follows:
www.sina.com.cn 202.20.132.102 2007-01-05 12:00
www.sina.com.cn 202.20.132.101 2007-01-05 12:00
www.sohu.com 202.20.131.101 2007-02-06 12:00

As for www.sina.com.cn, it is corresponding to two IP addresses and indicates the TTL of the two IP addresses. As for www.sohu.com, it is corresponding to one IP address and indicates the TTL thereof.

In Step S202, it is determined whether the TTL in the DNS record is 0 or not, and if the TTL in the DNS record is 0, the process proceeds to Step S203; otherwise, the process proceeds to Step S204.

Generally speaking, if TTL is 0, it indicates that this record does not need to be stored; otherwise, it indicates that this record is locally stored.

In Step S203, the DNS record is not stored or other operations are performed, and then this process ends. The method for not storing the DNS record may be discarding the DNS record.

In Step S204, the DNS record is locally stored, and the process proceeds to Step S205.

In Step S205, it is determined whether the size of all the currently stored DNS records is not smaller than a preset storing threshold, and if the size of all the currently stored DNS records is not smaller than a preset storing threshold, the process proceeds to Step S206; otherwise, the process ends.

Herein, the storing threshold is a standard set for a storage space where the DNS records are stored, and the standard may be set in many ways. For example, the standard may be set by randomly dividing a storage space in a storage medium of the terminal, or by estimating the amount of the DNS records to be acquired and then dividing a storage space. After the storage space is divided, it only needs to ensure that the set storing threshold is not higher than or is completely lower than the capacity limit of the storage space.

In Step S206, it is determined whether expired DNS records exist or not, and if expired DNS records exist, the process proceeds to Step S207; otherwise, the process proceeds to Step S209. The expired DNS records refer to those with the TTL being 0 that indicates the expiration of the records.

In Step S207, the expired DNS records are deleted, and the process proceeds to Step S208.

In Step S208, it is determined whether the size of the remaining DNS records is still not smaller than the preset storing threshold, and if the size of the remaining DNS records is still not smaller than the preset storing threshold, the process proceeds to Step S209; otherwise, the process ends. The remaining DNS records herein refer to the DNS records that are not expired.

In Step S209, a part of the DNS records is deleted, and proceed to Step S208.

A part of the DNS records may be deleted in various manners. For example, the DNS records are deleted depending on the time sequence of the DNS records to be expired; one or more DNS records about multiple IP addresses corresponding to one domain name are deleted; the DNS records are deleted in the sequence of storage; or the less frequently used DNS records are deleted. It should be noted that, the part of the DNS records herein may be one DNS record or multiple DNS records.

The above embodiment of the method is only one embodiment of storing the DNS records, and in fact variations can be made to this embodiment to produce multiple embodiments. For example, in at least one of steps S205 and S208, if it is determined that the size of the currently stored DNS records is not smaller than the storing threshold, it is further determined how much the size of the currently stored DNS records exceeds the storing threshold, i.e., the difference value. Once the difference value is determined, in at least one of the subsequent Step S207 and S209, a part of the DNS records having a size equivalent to the difference value is deleted. In practical applications, as new DNS records may be stored subsequently, it is proper to delete the DNS records with a size greater than the difference value.

The above embodiment of the method can be accomplished by a device, and thus the embodiment of the present invention further provides a device for storing DNS records. The device includes: a storage unit, adapted to store newly received DNS records, and store all the received DNS records needed to be stored; a DNS record size detection unit, adapted to compare the size of all the DNS records stored in the storage unit with a preset storing threshold; and a DNS record cleanup unit, adapted to delete a part of the DNS records stored in the storage unit if the DNS record size detection unit detects that the size of all the DNS records stored in the storage unit is greater than or equal to the preset storing threshold, so that the size of the remaining DNS records is not greater than or is smaller than the storing threshold.

The DNS records can be locally stored at a terminal, and thus the embodiment of the present invention further provides a terminal. The terminal includes: a storage unit, adapted to store newly received DNS records, and store all the received DNS records needed to be stored; a DNS record size detection unit, adapted to compare the size of all the DNS records stored in the storage unit with a preset storing threshold; and a DNS record cleanup unit, adapted to delete a part of the DNS records stored in the storage unit if the DNS record size detection unit detects that the size of all the DNS records stored in the storage unit is greater than or equal to the preset storing threshold, so that the size of the remaining DNS records is not greater than or is smaller than the storing threshold.

In all the embodiments of storing the DNS records according to the present invention, if it is determined that the size of all the stored DNS records is greater than or equal to the preset storing threshold, a part of the DNS records is deleted, so that the size of the remaining DNS records is not greater than or is smaller than the storing threshold. In this manner, the problem that the excessive storage of the DNS records may influence the storage of other data is solved for terminals with a small storage capacity.

In all the embodiments of storing the DNS records according to the present invention, if it is determined that the size of all the stored DNS records is greater than or equal to the preset storing threshold, the expired DNS records are deleted. In this manner, as these records are probably expired, the deletion of these records may not produce negative influence on the subsequent DNS query.

In all the embodiments of storing the DNS records according to the present invention, after deleting the expired DNS records, if the remaining DNS records are still greater than or equal to the preset storing threshold, a part of the DNS records is selected and deleted according to some strategies, where each strategy has its own advantages. For example, the deletion of a part of data closest to expiration may reduce the negative influence on the subsequent DNS query. A part of the DNS records is selected and deleted from all the DNS records about multiple IP addresses corresponding to one domain name. As the multiple IP addresses corresponding to one domain name may provide the same service, even if a part of the records is selected and deleted, the corresponding IP address may still be found when parsing the same domain name. The DNS records are deleted according to their storage sequence, which is a relatively simple management method, and a data structure like queue can be adopted in storing the DNS records. A part of the DNS records of low use rate is deleted, and since the DNS records of low use rate have little impact on the subsequent DNS query, even if these records are deleted, no negative influence will be produced on the subsequent DNS query.

In practical applications, one domain name may be corresponding to multiple IP addresses. The network equipment corresponding to each IP address may provide the same type of service, and definitely may provide different types of services. When a terminal sends a DNS query request to the DNS server, if the DNS server finds that the domain name carried by the query request is corresponding to multiple IP addresses, it attempts to select an appropriate IP address and return the IP address to the terminal.

Hereinafter, a technical solution of a domain name parsing method according to an embodiment is illustrated. This method includes: receiving a DNS query request sent by a terminal, where the DNS query request carries at least one of a service ID for identifying a service type and user information for identifying a user ID; selecting at least one IP address for the terminal according to at least one of the service ID and the user information; and returning the selected IP address to the terminal.

In the above embodiment of the method, when the DNS query request carries the service ID, at least one IP address corresponding to a network equipment capable of providing such service is selected and returned to the terminal.

In the above embodiment of the method, when the DNS query request carries the user information, at least one IP address corresponding to a network equipment that allows the terminal to access is selected and returned to the terminal.

The DNS query request may exist as a DNS query request message Question, and at least one of the service ID and the user information are carried in the head part of the Question or in the body part of the Question. Definitely, the DNS query request may exist as a single message different from the DNS query request message Question, and at least one of the service ID and the user information are carried in the single message.

In the above embodiment of the method, when the selected IP address is returned to the terminal, authentication data for security authentication may also be provided to the terminal. Thereby, the terminal may perform authentication on the authentication data.

In the above embodiment of the method, if the at least one IP address cannot be selected for the terminal according to at least one of the service ID and the user information, the method further includes providing an address of at least one other DNS server to the terminal, and sending, by the terminal, the DNS query request to the other DNS servers, where the DNS query request carries at least one of the service ID and the user information, until one of the DNS servers provides an IP address of a network equipment that conforms to at least one of the service ID and the user information.

In the above embodiment of the method, if the at least one IP address cannot be selected for the terminal according to at least one of the service ID and the user information, the method further includes: forwarding the DNS query request to other DNS servers, until one of the DNS servers provides an IP address of a network equipment that conforms to at least one of the service ID and the user information.

In the above embodiment of the method, if the at least one IP address cannot be selected for the terminal according to at least one of the service ID and the user information, or no DNS server can provide an IP address of a network equipment that conforms to at least one of the service ID and the user information, the information of parse error is returned to the terminal.

Figure 3:
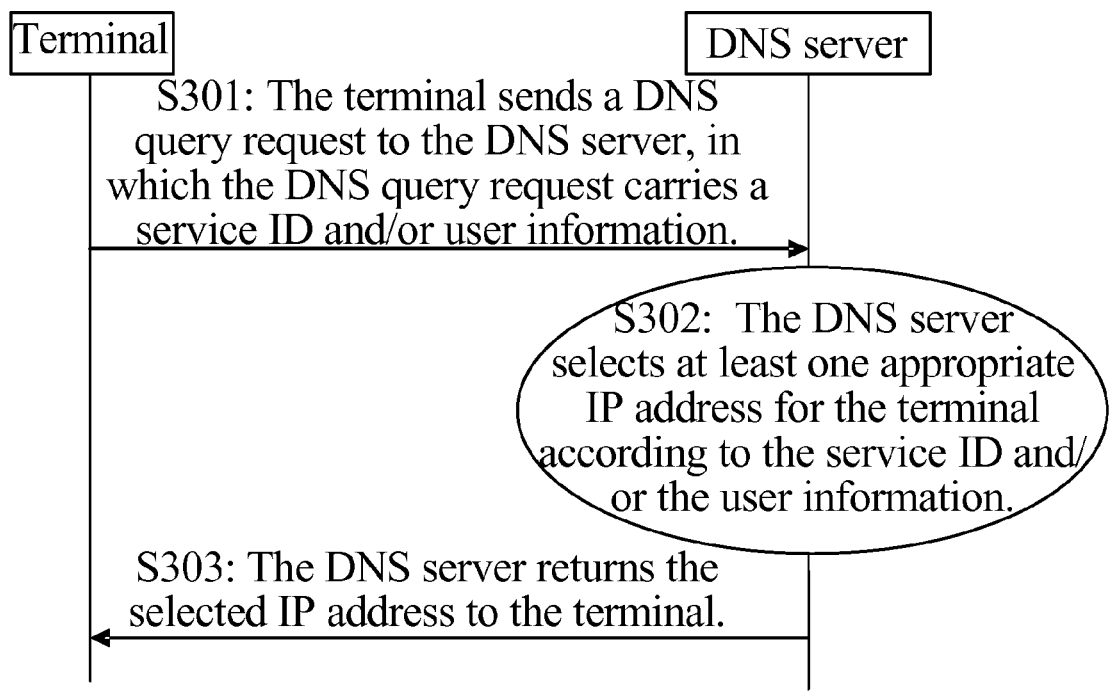
FIG. 3 is a flow chart of a method for parsing a domain name according to an embodiment of the present invention.

With reference to FIG. 3, an embodiment of a domain name parsing method is described in detail. Referring to FIG. 3, the method includes the following steps.

In Step S301, a terminal sends a DNS query request to a DNS server, where the DNS query request carries at least one of a service ID and user information.

Herein, the terminal may take various forms, for example, a PC or mobile phone.

The DNS query request may exist as a DNS query request message Question, and at least one of the service ID and the user information are carried in the head part of the Question message as listed in Table 1, or carried in the body part of the Question message as listed in Table 2, as Service TYPE and User Authentication Data.

TABLE 1

| Identification | Flags |
|---|---|
| Number of questions | Number of answer RRs |
| Number of authority RRs | Number of additional RRs |
| Service TYPE | User Authentication Data |
| Questions (variable number of questions) | |
| Answers (variable number of resource records) | |
| Authority (variable number of resource records) | |
| Additional information (variable number of resource records) | |

TABLE 2

| Identification | Flags |
|---|---|
| Number of questions | Number of answer RRs |
| Number of authority RRs | Number of additional RRs |
| Questions (variable number of questions) | |
| Answers (variable number of resource records) | |
| Authority (variable number of resource records) | |
| Additional information (Service TYPE) | |
| Additional information (User Authentication Data) | |

In addition, at least one of the service ID and the user information may also be sent in a form different from the Question message, or sent as a single message.

Furthermore, a message may carry multiple service IDs and user information.

In Step S302, the DNS server selects at least one appropriate IP address for the terminal according to the service ID and/or the user information.

In particular, when receiving the service ID, the DNS server selects at least one IP address corresponding to a network equipment capable of providing the service for the terminal from multiple IP addresses corresponding to the domain name needed to be parsed, and further selects at least one IP address corresponding to a network equipment having a low load. When receiving the user information, the DNS server selects at least one IP address corresponding to a network equipment that allows a user to access from multiple IP addresses corresponding to the domain name needed to be parsed, and further selects at least one IP address corresponding to a network equipment having a low load. The above described is also a technical means that guarantees network security.

In Step S303, the DNS server returns the selected IP address to the terminal.

In practical applications, the DNS server may exist as an Answer message. The Answer message includes at least one RR in the form of a four-tuple. Each RR may have a TTL indicating that the IP address is valid or that the terminal should store the RR.

In addition, in order to prevent a network attacker from using the DNS server identity to return an unreal or a hazard IP address to the terminal, the DNS server adds authentication data in the Answer message. After the terminal passes the authentication of the authentication data, it is determined that the Answer message is sent by the DNS server; otherwise, the Answer message is discarded or used in other processes. The authentication data is carried in the head part of the Answer message as listed in Table 3, or carried in the body part of the Answer message as listed in Table 4, as Server Authentication Data. Moreover, the authentication data may also be provided to the terminal as a single message.

TABLE 3

| Identification | Flags |
|---|---|
| Number of questions | Number of answer RRs |
| Number of authority RRs | Number of additional RRs |
| Service TYPE | Server Authentication Data |
| Questions (variable number of questions) | |
| Answers (variable number of resource records) | |
| Authority (variable number of resource records) | |
| Additional information (variable number of resource records) | |

TABLE 4

| Identification | Flags |
|---|---|
| Number of questions | Number of answer RRs |
| Number of authority RRs | Number of additional RRs |
| Questions (variable number of questions) | |
| Answers (variable number of resource records) | |
| Authority (variable number of resource records) | |
| Additional information (Service TYPE) | |
| Additional information (Server Authentication Data) | |

In Tables 3 and 4, the Service TYPE is optional, and if it exists, the value of the Service TYPE is the same as that in the Question message sent by the terminal.

In the above embodiment, if the DNS query request sent by the terminal carries the service ID, the DNS query request may carry other related information, so as to ensure that the DNS server may accurately provide the IP address corresponding to the network equipment required to be accessed. For example, the mail address of a user is zhangsan@sina.com, but the actual hostname of the mail server may be pop.sina.com. When setting up the mail account, the user just inputs the address "zhangsan@sina.com" and the password, and does not need to input the hostname "pop.sina.com" of the mail server. When receiving and sending mails, the terminal provides the "sina.com" information to the DNS server, and indicates the service type of the mail in the Service TYPE. According to the indicated service type of the mail and the "sina.com" information, the DNS server knows that it is the domain name of the mail server "pop.sina.com" that the terminal requests to parse, and then the DNS server parses the pop.sina.com. From the above example, if the terminal provides the service type and related information to the DNS server, the setting of some information like the domain name of the mail server can be omitted in the previous setup process, which brings much convenience to the terminal.

An example of a practical application of the domain name parsing method is illustrated as follows. In this example, it is assumed that a user is a subscriber of China Mobile, and China Mobile provides many brand services for the subscribers, such as GoTone, M-zone, and Easyown. When the subscriber visits the same Portal domain name, the DNS server selects an IP address of the related service and provides the IP address to the subscriber according to a service request from the subscriber. It is assumed that the subscriber selects the service types of Multimedia Messaging Service (MMS) and Push to Talk over Cellular (POC). Related information about the two types of services is listed in Table 5.

TABLE 5

| Domain name | IP address | Service port | Service ID | User authentication data |
|---|---|---|---|---|
| www.chinamobile.com | 202.10.2.12 | 10001 | POC | User name + password |
| | 202.10.2.13 | 10002 | MMS | User name + password |

Figure 4:
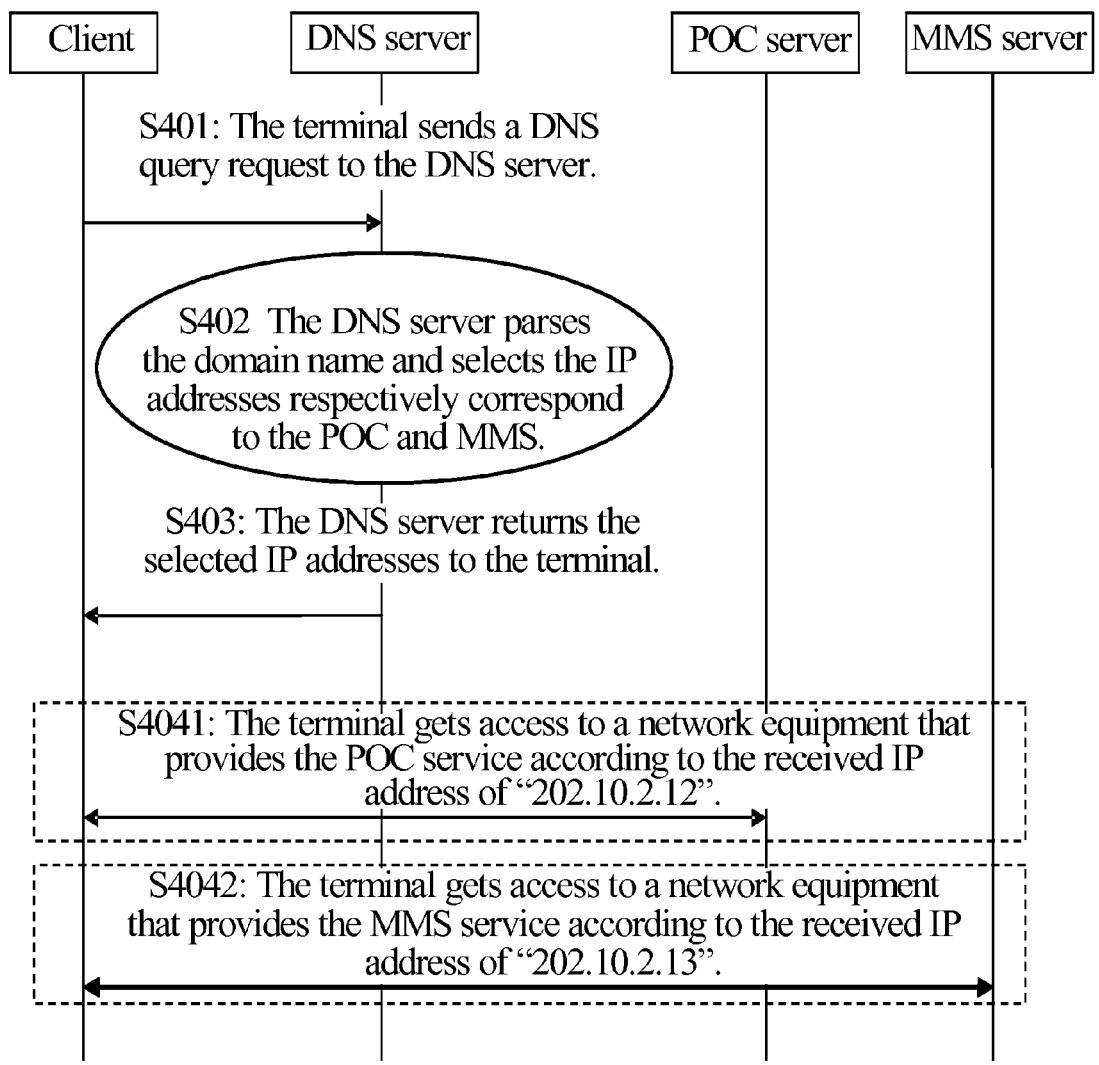
FIG. 4 is a flow chart of another method for parsing a domain name according to an embodiment of the present invention.

A domain name parsing process is illustrated in FIG. 4, which includes the following steps.

In Step S401, a terminal sends a DNS query request to a DNS server, where the DNS query request carries a domain name "www.chinamobile.com", service IDs of POC and MMS, and a user name and password for each service.

In Step S402, the DNS server parses the domain name "www.chinamobile.com", and selects the IP addresses "202.10.2.12" and "202.10.2.13" respectively corresponding to the POC and MMS after the user name and password are authenticated.

In Step S403, the DNS server returns the selected IP addresses to the terminal, and provides corresponding service ports to the terminal, the process respectively proceeds to Step S4041 and Step S4042.

In Step S4041, the terminal gets access to a network equipment that provides the POC service according to the received IP address of "202.10.2.12".

In Step S4042, the terminal gets access to a network equipment that provides the MMS service according to the received IP address of "202.10.2.13".

It should be noted that, in the above embodiment of the domain name parsing method, if the DNS server cannot parse the domain name or cannot locally find the IP address corresponding to the domain name, two solutions, namely, iterative parsing and recursive parsing are provided below. In the iterative parsing, in case of failing to find the corresponding records, the server returns the address of another DNS server that probably knows the result to the terminal, so that the terminal sends the DNS query request to the new DNS server. In the recursive parsing, the system composed of all the DNS servers is required to provide the parsing result as a whole, i.e., if the parsing result cannot be acquired from one of the DNS servers, the DNS server sends the DNS query request to the other DNS servers, until the query result is acquired or an error occurs.

The domain name is parsed from top to bottom according to the hierarchical structure. However, if each parsing request starts from the root server, the information flow reaching the root server increases along with the expansion of the scale of the Internet, which causes that the root server is overloaded due to the heavy load. Generally speaking, in most cases of parsing the domain name, the local domain name is parsed, which can be done at the local DNS server. Therefore, when the terminal intends to obtain IP addresses corresponding to a certain domain name, the terminal usually first sends a DNS query request to the local DNS server, which improves the efficiency of parsing the domain name.

Figure 5:
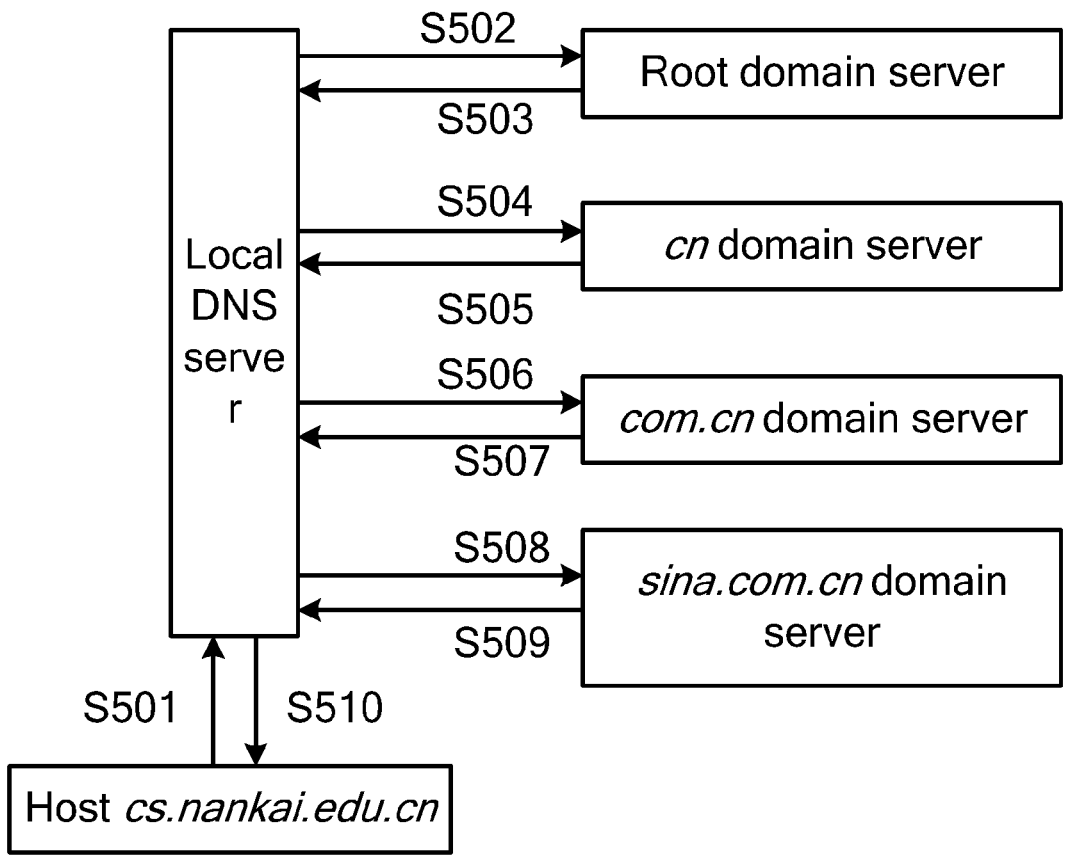
FIG. 5 is a schematic view of an embodiment of iterative parsing.

For example, a host cs.nankai.edu.cn queries the IP address of a host www.sina.com.cn, and the querying process where the iterative parsing is adopted is shown in FIG. 5. The host cs.nankai.edu.cn first sends a DNS query request to a local DNS server (Step S501). After receiving the DNS query request, the local DNS server searches for records locally. If it fails to find the corresponding record, the local DNS server sends an iterative parsing request to its own root domain server (Step S502). If the root domain server cannot parse, the address of a DNS server that manages the cn domain is returned (Step S503). The local DNS server hands over the DNS query request to the DNS server that manages the cn domain (Step S504). If the DNS server that manages the cn domain cannot parse, the address of a DNS server that manages the com.cn domain is returned (Step S505). The local DNS server hands over the DNS query request to the DNS server that manages the com.cn domain (Step S506). If the DNS server that manages the com.cn domain cannot parse, the address of a DNS server that manages the sina.com.cn domain is returned (Step S507). The local DNS server then hands over the DNS query request to the DNS server that manages the sina.com.cn domain (Step S508). The DNS server that manages the sina.com.cn domain returns a parsing result to the local DNS server (Step S509). The local DNS server returns the parsing result to the terminal (Step S510).

All the embodiments of the domain name parsing method can be accomplished by a device, and thus the embodiment of the present invention provides a domain name parsing device. The device includes: a DNS query request receiving unit, adapted to receive a DNS query request sent by a terminal, where the DNS query request carries at least one of a service ID for identifying a service type and user information for identifying a user ID; an IP address selecting unit, adapted to select at least one IP address for the terminal according to at least one of the service ID and the user information received by the DNS query request receiving unit; and an IP address providing unit, adapted to provide the IP address selected by the IP address selecting unit to the terminal.

The above embodiment of the domain name parsing device is applicable to a DNS serve, and thus the embodiment of the present invention further provides a DNS server. The DNS server includes: a DNS query request receiving unit, adapted to receive a DNS query request sent by a terminal, where the DNS query request carries at least one of a service ID for identifying a service type and user information for identifying a user ID; an IP address selecting unit, adapted to select at least one IP address for the terminal according to at least one of the service ID and the user information received by the DNS query request receiving unit; and an IP address providing unit, adapted to provide the IP address selected by the IP address selecting unit to the terminal.

In addition, the embodiment of the present invention further provides a domain name parsing result acquisition method. The method includes: sending a DNS query request to a DNS server, where the DNS query request carries at least one of a service ID for identifying a service type and user information for identifying a user ID; and receiving at least one IP address provided by the DNS server, where the at least one IP address is selected by the DNS server for the terminal according to at least one of the service ID and the user information.

Correspondingly, the above embodiment of the domain name parsing result acquisition method may be accomplished by a domain name parsing result acquisition device. The device includes: an information loading unit, adapted to load at least one of a service ID for identifying a service type and user information for identifying a user ID to a DNS query request; a DNS query request sending unit, adapted to send the DNS query request loaded with at least one of the service ID and the user information to a DNS server; and an IP address receiving unit, adapted to receive at least one IP address provided by the DNS server, where the at least one IP address is selected by the DNS server for the terminal according to at least one of the service ID and the user information.

The above domain name parsing result acquisition method is applicable to a terminal, and thus the embodiment of the present invention further provides a terminal. The terminal includes: an information loading unit, adapted to load at least one of a service ID for identifying a service type and user information for identifying a user ID to a DNS query request; a DNS query request sending unit, adapted to send the DNS query request loaded with at least one of the service ID and the user information to a DNS server; and an IP address receiving unit, adapted to receive at least one IP address provided by the DNS server, where the at least one IP address is selected by the DNS server for the terminal according to at least one of the service ID and the user information.

In all the embodiments of the domain name parsing method according to the present invention, after the DNS query request that carries at least one of the service ID and the user information is received, an appropriate IP address is selected for the terminal according to at least one of the service ID and the user information, thus avoiding the circumstance that the selected IP address is inappropriate as the terminal is not taken into account, and solving the problem of selecting the appropriate IP address for the terminal when the terminal is taken into account.

In all the embodiments of the domain name parsing method according to the present invention, the DNS query request may be in the form of a Question message, and may be accomplished by adding at least one of the service ID and the user information in at least one of the head part and the body part of the Question, which is relatively convenient in implementation.

In all the embodiments of the domain name parsing method according to the present invention, when the selected IP address is returned to the terminal, authentication data for security authentication may also be provided to the terminal. In this manner, the terminal may perform authentication on the authentication data, so as to prevent a network attacker from using the DNS server identity to return a hazard IP address to the terminal, thereby enhancing the network security.

In all the embodiments of the domain name parsing method according to the present invention, if the at least one IP address cannot be selected for the terminal according to at least one of the service ID and the user information, other DNS servers are requested for help, and the addresses of the other DNS servers are returned to the terminal. The terminal sends the same DNS query request to the other DNS servers according to these addresses, which guarantees the terminal to obtain the desired IP address to the maximum extent.

In the above embodiments of the method, device, and terminal for storing the DNS records, if it is determined that the size of all the stored DNS records does not satisfy the preset storing threshold, a part of the DNS records is deleted to enable the size of the remaining DNS records to satisfy the storing threshold. In this manner, the problem that the excessive storage of the DNS records may influence the storage of other data is solved for terminals with a small storage capacity.

In the above embodiments of the method, device, and terminal for storing the DNS records, after the DNS query request that carries at least one of the service ID and the user information is received, an appropriate network address corresponding to the domain name is selected for the terminal according to at least one of the service ID and the user information, thus avoiding the circumstance that the selected network address is inappropriate as the terminal is not taken into account, and solving the problem of selecting the appropriate network address for the terminal when the terminal is taken into account.

The preferred embodiments of the present invention are described above. It should be noted that, persons of ordinary skill in the art can make some modifications and variations without departing from the spirit of the present invention, and the modifications and variations also fall within the scope of the invention.

What is claimed is:

1. A method for storing domain name system (DNS) records, the method comprising:
sending a DNS query request to a DNS server, wherein the DNS query request carries at least one of a service identity (ID) and user information;
receiving a plurality of DNS records including at least one DNS record returned by the DNS server according to the DNS query request;
locally storing received DNS records that need to be stored; and
if a size of all the stored DNS records does not satisfy a preset storing threshold, deleting a part of the stored DNS records, wherein a size of the remaining DNS records after deletion satisfies the storing threshold.

2. The method for storing DNS records according to claim 1, wherein locally storing the received DNS records: comprises locally storing newly received DNS records.

3. The method for storing DNS records according to claim 2, wherein locally storing the received DNS comprises locally storing newly received DNS records whose time-to-live (TTL) is not 0.

4. The method for storing DNS records according to claim 1, wherein the size of all the stored DNS records does not satisfy the preset storing threshold when the size of all the stored DNS records is greater than the preset storing threshold, and wherein the size of the remaining DNS records after deletion is not greater than the storing threshold.

5. The method for storing DNS records according to claim 1, wherein the size of all the stored DNS records does not satisfy the preset storing threshold when the size of all the stored DNS records is not smaller than the preset storing threshold and wherein the size of the remaining DNS records after deletion is smaller than the storing threshold.

6. The method for storing DNS records according to claim 1, wherein deleting the part of the stored DNS records comprises:
if expired DNS records exist, deleting the expired DNS records; and
if the size of the remaining DNS records still does not satisfy the storing threshold after deleting the expired DNS records, deleting other DNS records so that the size of the remaining DNS records after deletion satisfy the storing threshold.

7. The method for storing DNS records according to claim 6, wherein deleting the other DNS records comprises at least one of these processes:
deleting DNS records closest to expiration;
selecting and deleting a part of the DNS records from all the DNS records about multiple IP addresses corresponding to one domain name;
deleting DNS records in sequence following a storing order; and
deleting DNS records with low use rate.

8. The method for storing DNS records according to claim 1, wherein deleting the part of the stored DNS records comprises:
if expired DNS records do not exist, deleting the part of the DNS records to enable the size of the remaining DNS records after deletion to satisfy the storing threshold.

9. A device for storing domain name system (DNS) records, the device comprising:
a requesting unit configured to send a DNS query request to a DNS server, wherein the DNS query request carries at least one of a service identity (ID) and user information;
a receiving unit configured to receive a plurality of DNS records including at least one DNS record returned by the DNS server according to the DNS query request;
a storage unit, configured to store received DNS records needed to be stored;
a DNS record size detection unit, configured to detect whether a size of all the DNS records stored in the storage unit satisfies a preset storing threshold; and
a DNS record cleanup unit, configured to delete a part of the DNS records stored in the storage unit if the size of all the stored DNS records does not satisfy the storing threshold, wherein a size of remaining DNS records after deletion satisfy the storing threshold.

10. The device according to claim 9, wherein:
the DNS record size detection unit is specifically configured to compare the size of all the DNS records stored in the storage unit with the preset storing threshold; and
the DNS record cleanup unit is specifically configured to delete a part of the DNS records stored in the storage unit when the size of all the stored DNS records is greater than the storing threshold, so that the size of the remaining DNS records after deletion is not greater than the storing threshold.

11. The device according to claim 9, wherein:
the DNS record size detection unit is specifically configured to compare the size of all the DNS records stored in the storage unit with the preset storing threshold; and
the DNS record cleanup unit is specifically configured to delete a part of the DNS records stored in the storage unit when the size of all the stored DNS records is not smaller than the storing threshold, so that the size of the remaining DNS records after deletion is smaller than the storing threshold.

12. The device according to claim 9, wherein the device for storing domain name system (DNS) records is a terminal.

13. The device according to claim 9, wherein the DNS record cleanup unit is configured to determine that expired DNS records do not exist, and upon determining that the expired records do not exist, to delete the part of the DNS records to enable the size of the remaining DNS records after deletion to satisfy the storing threshold.

14. A method for storing domain name system (DNS) records, the method comprising:
sending a DNS query request to a DNS server, wherein the DNS query request carries at least one of a service identity (ID) and user information;
receiving a plurality of DNS records including at least one DNS record returned by the DNS server according to the DNS query request;
locally storing the received DNS records;
determining that a size of the locally stored DNS records does not satisfy a preset storing threshold; and
deleting a part of the locally stored DNS records, wherein a size remaining DNS records satisfies the storing threshold.

15. The method for storing DNS records according to claim 14, wherein locally storing the received DNS records comprises locally storing received DNS records with a time-to-live (TTL) that is not 0.

16. The method for storing DNS records according to claim 14, wherein deleting the part of the locally stored DNS records comprises:
determining that expired DNS records exist; and
deleting the expired DNS records.

17. The method for storing DNS records according to claim 16, further comprising:
after deleting the expired DNS records, determining whether a size of DNS records remaining after the deleting the expired DNS records does or does not satisfy the storing threshold; and
if the size of size of DNS records remaining after the deleting does not satisfy the storing threshold after deleting the expired DNS records, deleting a part of the DNS records remaining after the deleting the expired DNS records so that the size of remaining DNS records satisfies the storing threshold.

18. The method for storing DNS records according to claim 17, wherein deleting the part of the DNS records remaining after the deleting the expired DNS records comprises at least one of these processes:
deleting DNS records closest to expiration;
selecting and deleting DNS records that have multiple IP addresses corresponding to one domain name;
deleting DNS records in sequence following an order in which they were stored; and
deleting a DNS records with low use rate.

19. The method for storing DNS records according to claim 14, wherein deleting the part of the locally stored DNS records comprises:
determining that no expired DNS records are locally stored; and
deleting the part of the locally stored DNS records by performing at least one of these processes:
deleting DNS records closest to expiration;
selecting and deleting DNS records that have multiple IP addresses corresponding to one domain name;
deleting DNS records in sequence following an order in which they were stored; and
deleting DNS records with low use rate.

20. The method for storing DNS records according to claim 14, wherein deleting the part of the stored DNS records comprises:
if expired DNS records do not exist, deleting the part of the DNS records to enable the size of the remaining DNS records after deletion to satisfy the storing threshold.

* * * * *